United States Patent [19]

Barrigar

[11] 4,455,866

[45] Jun. 26, 1984

[54] MOTOR VEHICLE TESTING APPARATUS

[76] Inventor: Robert H. Barrigar, Suite 700, The National Bldg., 130 Slater St., Ottawa, Ontario, K1P 6E2, Canada

[21] Appl. No.: 421,437

[22] Filed: Sep. 22, 1982

[51] Int. Cl.³ .......................................... G01M 15/00
[52] U.S. Cl. .................................................. 73/117
[58] Field of Search ................................ 73/117, 117.2

[56] References Cited

U.S. PATENT DOCUMENTS

| | | | |
|---|---|---|---|
| 3,333,463 | 8/1967 | Hollinghurst | 73/117 |
| 3,520,180 | 7/1970 | Polhemus et al. | 73/117 |
| 3,750,464 | 8/1973 | Ostrander | 73/117 |
| 3,763,699 | 10/1973 | Sangster | 73/117 |
| 3,837,219 | 9/1974 | Clayton | 73/117 |

FOREIGN PATENT DOCUMENTS 845043  7/1981  U.S.S.R. ............................. 73/117.3

*Primary Examiner*—Gerald Goldberg
*Assistant Examiner*—Ellwood G. Harding, Jr.
*Attorney, Agent, or Firm*—Barrigar & Oyen

[57] ABSTRACT

For testing the dynamic characteristics of a motor vehicle, an endless movable road surface for supporting and moving with respect to motor vehicles. The motor vehicle is restrained from movement but its wheels are permitted to move in contact with the simulated road surface. The simulated road surface may be the periphery of a wheel whose circumference is relatively large compared to the wheel base of the automobile, or it may be a relatively flat run of an endless belt supported on multiple rollers. In either case, all the wheels of the motor vehicle are supported by the simulated road surface. Preferably the effective inertial load of the simulated road surface is adjusted to be approximately equal to the mass of the motor vehicle. One or more of a plurality of selectably attachable inertial masses may be coupled to the system to permit the inertial mass of the system to vary according to the inertial mass of the vehicle being tested. The road surface may be varied in texture and profile to permit a variety of road surface conditions to be simulated. The system may be coupled to a generator driving a selected load to simulate dynamic resistance such as wind resistance to the motion of the motor vehicle. The restraining device for the motor vehicle preventing longitudinal movement of same may be mounted for pivotal movement about a vertical axis and for lateral movement relative to the road surface simulator so as to permit steering of the motor vehicle relative to the simulated road surface.

9 Claims, 3 Drawing Figures

MOTOR VEHICLE TESTING APPARATUS

BACKGROUND OF THE INVENTION

The invention is apparatus for the testing of motor vehicles comprising a movable endless simulated road surface (such as an endless belt) for cooperation with a motor vehicle restrained from longitudinal movement relative to the direction of motion of the simulated road surface. The four wheels of the motor vehicle, when the apparatus is operational, are in contact with the peripheral road-simulating surface. Operation is possible in one of two ways: Either the motor vehicle engine is operated, the motor vehicle put in gear and the motor driven, thereby forcing the endless road surface to move relative to the fixed motor vehicle, or else the motor vehicle transmission is put in neutral and the endless simulated road surface is separately driven.

The general concept of providing a test bed with a movable surface to support a pair of wheels of a motor vehicle is well known. An example of such a test bed is described in U.S. Pat. No. 4,158,961 (Ben-David, June 26, 1979). The Ben-David apparatus comprises a pair of rollers between which may be rotated a pair of wheels of a motor vehicle. There is no provision for similar support of any of the other wheels of the motor vehicle. The small rollers in contact with the motor vehicle's wheel supported do not really purport to simulate a road surface—they are too small in diameter to make this possible. Even if the Ben-David apparatus were duplicated so that another pair of the motor vehicle wheels were supported, this would still not provide a road surface simulation, because quite artificially the two pair of motor vehicle support wheels would be in contact with and separately engaging completely different sets of rotating support surfaces. This does not serve to simulate a road surface at all—in a road surface simulation test, obviously the dynamics of the entire motor vehicle relative to the road should should be evaluated if at all possible.

Heretofore the most common method of testing motor vehicles for driving and handling characteristics and the like on a road has been accomplished by driving the motor vehicle on a test track. This kind of testing will still continue to be required, since test conditions involving loose sand, slalom courses, etc., cannot readily be provided by a stationary testing facility. However, the disadvantages of test track monitoring are obvious—it is frequently impossible to obtain dynamic measurements of the motor vehicle under operating conditions, difficult to produce acceptable motion picture or video taped records of motor vehicle dynamics, etc. This is presumably what led to Ben-David's proposal that some of these dynamic characteristics be investigated by keeping the motor vehicle stationary whilst permitting a pair of its wheels to engage rotatable rollers thereby to permit some observation of the dynamics of the pair of wheels under test.

Ben-David also recognized that for some purposes it may be desirable to have the inertial mass of the roller system in contact with the motor vehicle wheels under test to be roughly equal to the mass of the motor vehicle. He proposed in the aforementioned U.S. patent that a flywheel be attached to one of the rollers so as to simulate the vehicle weight. However, apart from the fundamental problem with his proposal indicated previously, namely, the incapability of his device to simulate an actual road surface, there are these additional disadvantages associated with the Ben-David proposal:

1. There is no disclosure of any means for adjusting the inertial mass of the system to enable testing of a multiplicity of motor vehicles of varying masses.
2. There is no possibility of steering the motor vehicle relative to the movable support surface.
3. There is no means provided for varying the texture or profile of the support for the motor vehicle wheels.
4. There is no means for simulating other dynamic conditions which may be encountered by a motor vehicle in actual use, such as wind resistance.

SUMMARY OF THE INVENTION

The present invention overcomes the fundamental deficiency of the Ben-David teaching by providing an apparatus for facilitating observation or measurement of one or more selected dynamic characteristics of a motor vehicle which comprises an endless movable road surface simulation means such as an endless belt which provides a simulated road surface for contacting simultaneously all of the wheels of the motor vehicle. The motor vehicle is thereby supported on the endless movable road surface and its wheels are permitted to rotate relative to the road surface, either in driving mode or driven mode, depending upon whether the motor vehicle engine and transmission are operated or whether they are not. The motor vehicle is restrained from moving longitudinally relative to the direction of motion of the simulated road surface while under test. This apparatus enables the dynamics of the motor vehicle as actually supported and driven on a representative road surface to be monitored; the dynamics of the entire vehicle under operating conditions can be observed.

If the road surface simulation means is an endless belt, then it should be supported immediately underneath the motor vehicle (or at least the pairs of wheels of the motor vehicle) to provide a relatively flat run for the motor vehicle. This can be accomplished for example by providing a multiplicity of relatively small diameter rollers underneath that portion of the endless belt which passes directly underneath the motor vehicle.

If the endless movable road surface simulation means is a wheel, it should have a circumference which is large relative to the wheel base of the motor vehicle. Otherwise there might be undesired engagement between the wheel and the undercarriage of the motor vehicle, and the angles of tangential contact between the motor vehicle wheels and the road surface simulation wheel would not approximate representative operational conditions.

Preferably the inertial mass of the road surface simulation means, whether it be an endless belt or a wheel, should be selected to be approximately equal to the mass of the motor vehicle under test. (This may be difficult to arrange in a wheel of practical dimensions, and thus the endless belt is preferred). If approximate equality of the two masses is arranged, then acceleration and braking tests can be relatively accurately effected. Since it is desirable to use the same test facility for a multiplicity of motor vehicles of varying masses, it is desirable to have some means for varying the inertial mass of the endless movable road surface simulation means. This can be accomplished, for example, by arranging a plurality of rotatable flywheel elements coaxially with an axis of rotation of the endless movable road surface simulation means (the axis of rotation of the wheel, or the axis of rotation of an end support roller for the endless belt, for example) and providing coupling means for selectably coupling one or more of these flywheel elements to the endless movable road surface simulation means. The road surface simulation means without additional inertial masses being coupled thereto might be selected to have a mass equal to the mass of the smallest motor vehicle to be tested. Then additional flywheel masses could be one after another selectably coupled to the endless movable road surface simulation means to accommodate increasingly heavier motor vehicles. If for example the flywheels are slidably mounted on a shaft of the same diameter as the shaft of the endless movable road surface simulation means, and the two shafts are arranged to be in close proximity to one another, then the fly wheels can simply be slid one after another along the inactive shaft and placed upon a protruding end of the shaft of the endless movable road surface simulation means and bolted to a coupling member fixed to the shaft of the endless movable road surface simulation means.

To permit the motor vehicle to be steered at least to some extent, the restraining means for preventing longitudinal movement of the motor vehicle while under test can be mounted, preferably through an overhead arrangement, on a pivotal supporting device which is pivotable about a vertical axis, and which is also capable of lateral movement relative to the simulated road surface. Such mounting permits the motor vehicle to be steered and to move from side to side within the lateral dimensions of the simulated road surface. Obviously to obtain maximum benefit from this feature, the simulated road surface must be appreciably wider then the motor vehicle under test.

The simulated road surface may be selected to be of any convenient material but for many purposes a relatively hard and durable elastomeric material may be suitable. In the case of a wheel simulator, the outer elastomeric coating (or whatever other material is chosen) should have under support from a relatively firm unyielding material such as steel. In the case of an endless belt road surface simulator, the simulated road surface material must flex to permit the material to pass around the supporting end rollers of the simulator and yet must offer a relatively firm support to the motor vehicle. This can conveniently be accomplished by having a multiplicity of hard steel rollers arranged immediately underneath the motor vehicle so that there is relatively little downward deflection of the simulated road surface as it passes underneath the motor vehicle.

It may be desirable to vary the texture or profile of the simulated road surface and the apparatus according to this invention readily accommodates such possibility. Various types of surface materials can be applied as a thin layer to the outer periphery of the road surface simulator. Simulated bumps in the road surface can be attached, for example, to the periphery of the road surface simulation means. Water sprays or the like could be added to simulate wet surface conditions.

The usual test instruments can be attached to the motor vehicle and also the road surface simulation apparatus.

It may be desirable to add a drive motor, an electric generator or an electric motor-generator to the road surface simulator, to be selectably coupled with the shaft of the road surface simulator. The motor would enable the wheel to be turned or the endless belt to be driven while the motor vehicle engine is shut off and the motor vehicle placed in neutral, so as to observe certain dynamic characteristics of the motor vehicle which can be appropriately monitored without having the motor vehicle engine drive the motor vehicle. The generator can be connected to a load so that when the motor vehicle engine and transmission are operated and the motor vehicle drive wheels are causing the endless movable road surface to move, the generator driving the load simulates resistance encountered by the motor vehicle in the course of its motion. Since there will be relatively little actual wind resistance in this test setup, the driving of the load by the generator can simulate wind resistance. Since wind resistance may not be a linear function of motor vehicle speed, arrangements can be made to vary the load in a non-linear manner to accord with observed wind dynamics.

The reactance of, for example, an electric generator is the electrical counterpart of inertial mass. If the automobile engine drives not only the inertial mass of the road surface simulation means but also a coupled electric generator, it must during acceleration apply energy not only to a mechanical system but also to an electrical system, overcoming the mechanical inertial load and the electrical reactive load. This implies that in selecting the inertial mass of the mechanical system, one must either plan to disconnect the generator during braking and acceleration tests, or one must have regard also to the reactive load imposed by the generator (and also the reactive component of any external load to which the generator is connected), so that the gross effective inertial load, composed of the actual inertial mass plus the electrical reactive load, "seen" by the automobile engine is made approximately equal to the mass of the vehicle under test.

This suggests a further variant of the system. Instead of coupling additional inertial masses to the system to compensate for variation of vehicle mass, one could conceivably connect appropriate reactive loads to the generator, taking into account also the internal reactance of the generator. Obviously one would have to take into account any non-linearities in transient electric circuit operation.

DETAILED DESCRIPTION WITH REFERENCE TO THE DRAWINGS

Figure 1:
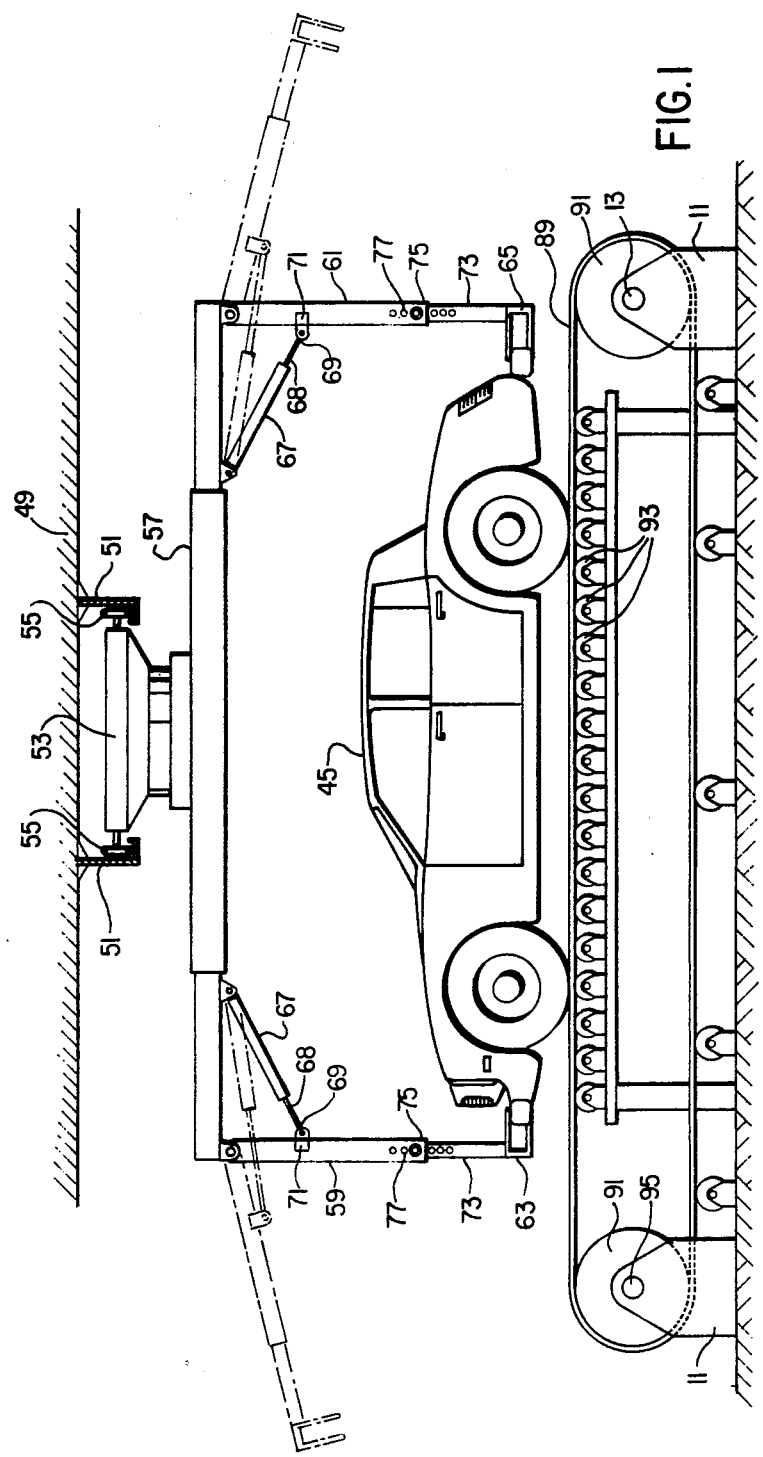
FIG. 1 is a schematic elevation view of an endless belt embodiment of endless movable road surface simulation means according to the invention, showing a motor vehicle in place for testing thereon, but for simplicity excluding the inertial masses and motor/generator illustrated in FIG. 2.

In FIG. 1, an endless road surface simulating belt 89 is trained around end support rollers 91 having shafts 95, 13 mounted for rotation in bearings 11. Immediately underneath a motor vehicle 45 under test, a plurality of small-diameter rollers 93 offer additional closely spaced support for the belt 89. Thus that portion of the belt 89 travelling immediately underneath the motor vehicle 45 is given relatively firm and rigid support. The rollers 93 are preferably made of steel or some other suitable unyielding material. The rollers 93 are freely rotatable. The rollers 91 may either or both be connected to a motor generator (not shown in FIG. 1; see FIG. 2 and discussion below) so that they may be driven by the motor generator or may be freely rotatable and driven by the drive wheels of the motor vehicle 45, according to the user's wish, as discussed in more detail with reference to the apparatus of FIG. 1.

Coupled to the shaft 13 on one side of the belt 89 via any conventional clutch means (not specifically shown) is an electric motor-generator 23 electrically connected to an adjustable load 25. The motor-generator 23 is optional and for some types of testing can be eliminated, but its use gives rise to the possibility of electrical adjustment to compensate for variable inertial mass of the vehicle, as will be discussed below. Also coupled directly or indirectly to the shaft 13 is appropriate measuring and testing equipment 27 known per se and not part of the present invention. It is to be understood that measuring and testing equipment could be located at other preferred locations of the road surface simulation apparatus, or on or adjacent the motor vehicle under test.

Figure 2:
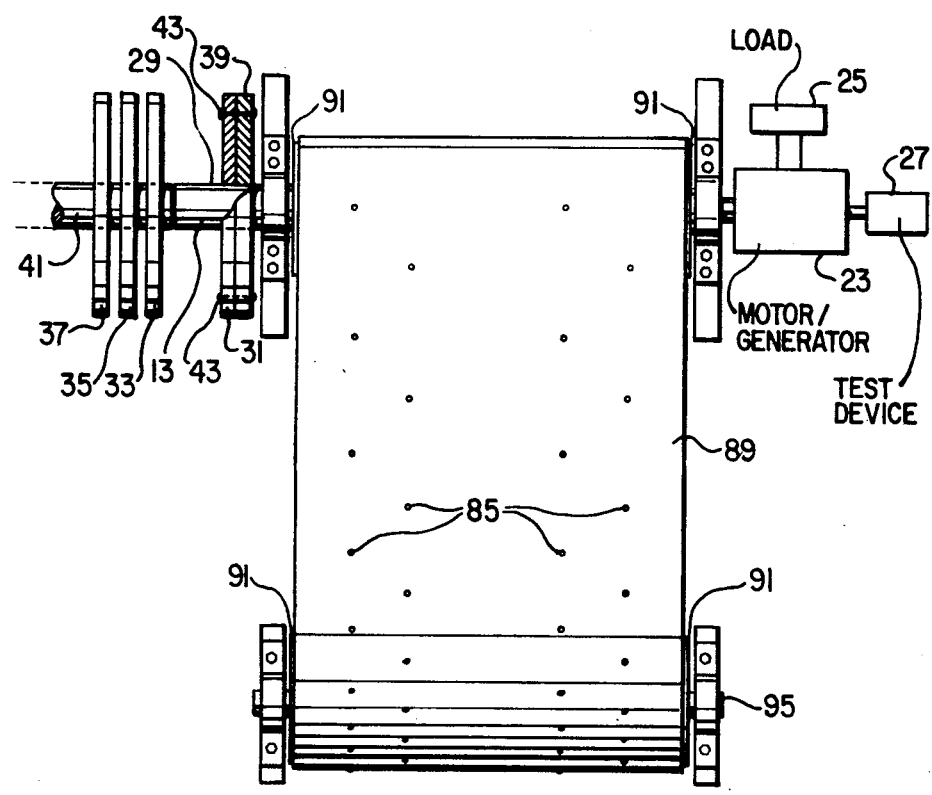
FIG. 2 is a schematic plan view of the belt portion of the apparatus of FIG. 1, together with associated inertial masses and motor/generator.

At the other side of the belt 89, a protruding end 29 of shaft 13 is provided for receiving one or more flywheel elements 31, 33, 35, 37, four such elements being shown by way of illustration, but the number of which can vary according to the circumstances. Fixed to the shaft 13 inboard of the protruding shaft end 29 is a coupling flange 39 for coupling to one or more of the flywheel elements 31 through 37. Those flywheel elements 33, 35 and 37 not for the time being coupled to flange 39 are slideably located on a shaft 41 aligned with shaft 13, one end 43 of which shaft 41 is immediately adjacent to but not in contact with the protruding end 29 of shaft 13. Conveniently the diameter of shaft 41 may be identical to the diameter of protruding end 29 of shaft 13. This arrangement permits the flywheel elements 31, 33, 35, 37 to be slid along shaft 41 onto protruding end 29 of shaft 13. Once on shaft 13, the flywheel elements may be fixed to flange 39 so as to rotate with the shaft 13. In FIG. 2, by way of illustration, one of the flywheel elements 31 is shown as connected by nuts and bolts 43 to flange 39, but any desired fastening means can be used. Desirably the flywheel elements 31 through 37 and any coupling means are arranged so that circular symmetry about the axis of shaft 13 is preserved, thereby avoiding any rotary imbalance in the system.

Attached to the roof structure 49 of the building in which the apparatus is located are a pair of laterally disposed overhead tracks 51 in which restraining support frame pivot unit 53 is laterally movably supported by support wheels 55 rotatable along the lateral guide tracks 51. A motor vehicle restraint frame 57 is pivotally attached to the underside of the pivot support unit 53. The frame 57 extends longitudinally a distance approximately equal the median length of motor vehicles to be tested on the belt 89. Pivotally connected to the forward end of frame 57 is a forward vertical restraint arm 59; a similar rear restraint arm 61 is pivotally mounted to the rear end of frame 57. At the lowermost end of restraint arms 59 and 61 are bumper clamping brackets 63, 65 respectively for clamping to the bumper of the motor vehicle to be tested.

Cylinders 67 are pivotally mounted towards the forward and rearward ends of frame 57 and the remote ends 69 of their associated pistons are pivotally connected to a bracket 71 fixed to front and rear restraint arms, 59, 61 repectively. In fully retracted position of the pistons within cylinders 67, the arms 59, 61 form acute angles with the frame 57; at the full extension of the pistons within the cylinder 67, the restraint arms 59, 61 make pronounced obtuse angles with the frame 57 (see the broken line view of the arms 59 and 61 in FIG. 1). In full extension of the pistons 68, the arms 59 and 61 should pivot upward sufficiently to enable the motor vehicle 45 to pass thereunder for the purposes of entering or leaving the test area.

It can be seen that this restraint arrangement will accommodate motor vehicles of varying lengths. To improve the ease of accommodation, some further adjustment is desirable; this can be accomplished by hydraulic extensibility of the ends of frame 57 to permit variation in the overall separation between restraint arms 59 and 61; whether such additional adjustment means is required will depend upon the range of lengths of motor vehicles to be tested. It may also be desirable to provide some vertical adjustment either in the vicinity of the pivot support arrangement 53 or, as illustrated in FIG. 1, by providing adjustment of the lowermost portions 73 of arms 59 and 61 relative to their upper portions. The lowermost portions 73 and the lowermost ends of the upper portions 75 of these restraint arms are provided with equally spaced holes 77; the lowermost portions 73 are free to telescope vertically relative to the uppermost portion 75, and can be fixed in a preferred position relative to the uppermost portion 75 by inserting pins or bolts in selected ones of the holes 77. Other means of vertical and horizontal adjustment will be readily apparent to persons skilled in the mechanical arts.

Figure 3:
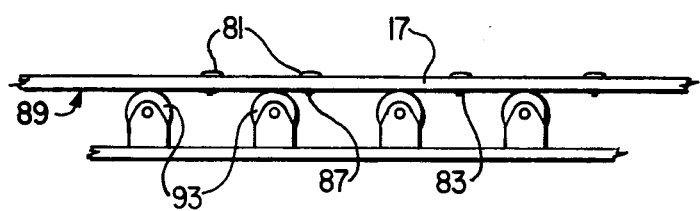
FIG. 3 is a detailed schematic elevation view of a portion of the road surface simulator of FIG. 1, showing the addition of bump simulators to the road surface periphery.

In order to provide a firm support for the motor vehicle wheels, the belt 89 should include an underlayer of strong rigid material such as steel reinforced woven elastomeric material upon which an upper road simulating outer surface may be applied. The manner of application can be selected so that if desired, different types of simulated road surface may be attached or applied to the underlayer. The profile of the simulated road surface can be varied; for example, FIG. 3 shows the addition of bump simulators 81 which are attached to the belt 89 by means of bolts 83 protruding from the undersides of bump simulators 81 through holes 85 located at spaced intervals about the belt 89. To accommodate these, recesses (not shown) may be present in the profile of rollers 91. Nuts 87 threadedly engaging bolts 83 are then used to tighten and fix securely the bump simulators 81 to the belt 89.

Other apparatus can be added to simulate additional conditions; for example, water sprays could be located above the belt 89 to provide a wet surface.

The motor vehicle under test may be tested in one of two ways. It may be operated with its engine running and transmission engaged so that drive wheels of the motor vehicle in contact with the belt 89 cause the belt 89 to move. As mentioned previously, the inertial mass of the belt 89, rollers 91 and all elements carried by shaft 13 should be selected to be approximately equal to the mass of the motor vehicle 45 under test. Preferably the effective mass of the system is selected to be equal to the mass of the smallest motor vehicle expected to be tested. The effective mass must take into account the reactive load presented by the motor-generator and any load connected to the generator output, as discussed above, or else the motor-generator should be disconnected from the system during acceleration and braking tests. Then as motor vehicles of greater weight are tested, one or more flywheel masses 31, 33, 35, 37, etc., can be added to increase the inertial mass of the road surface simulator to equal as closely as possible the mass of the motor vehicle under test. This enables reasonably reliable measurements of acceleration and braking capability to be made.

Alternatively, instead of or in addition to mechanically coupling additional inertial masses to the system to compensate for variations in vehicle weight, one may electrically couple an adjustable reactive load to the output of motor-generator 23, duly corrected or further adjusted to take into account transient circuit non-linearities. The automobile driving wheels and engine could then "see" an effective inertial load comprising mechanical mass and an electrical reactance. Either mass or electrical reactive load may be varied, or both may be varied, to simulate the inertial mass of the vehicle under test. The principles of analogies between electrical and mechanical systems, of transient circuit phenomena, and of compensation for non-linearities have been well developed and analyzed in electrical and mechanical engineering by others. These principles are not per se part of the present invention, which involves in the foregoing respect a particular application of those principles.

Further, if it should happen that the mass of the road surface simulator is greater than the mass of the vehicle under test, it should be readily possible to devise a positive feedback loop in the electrical system and to operate the motor-generator 23 in motor mode such that the burden of accelerating the mass of the mechanical system during acceleration tests, for example, is shared by the automobile engine and the motor-generator 23, the motor-generator 23 driving the mechanical system only to the extent of compensating for the excess of mass of the road surface simulator over the mass of the vehicle. However, this second mode of electrical compensation is more complicated than the first mode previously described, and is not generally preferred. If however to make the road surface simulator as large and strong as desired, it also appears necessary to make it heavier than the motor vehicles (or some of them) to be tested, then the second mode of electrical compensation could be used.

To measure motor vehicle engine operation under simulated conditions of wind resistance, motor-generator 23 is operated as a generator and coupled to a load 25 the impedence of which is selected to simulate wind resistance and any other dynamic resistance which the motor vehicle might encounter when actually travelling along a road. If through wind tunnel tests or the like it is found that for any given motor vehicle the wind resistance is a non-linear function of road speed, then the impedence of load 25 may be varied in a non-linear manner as the speed of rotation of the rotor of motor generator 23 varies.

Alternatively, the engine of motor vehicle 45 under test may be shut off, the transmission disengaged, and the dynamics of the motor vehicle in operation under road conditions may be observed and tested by having the motor generator 23, now disconnected from the load 25, operate as a motor and advance the belt 89 at any desired rate of speed. This enables, for example, monitoring of undercarriage performance under bumpy or other conditions without the necessity of running the motor vehicle engine.

The specific tests to be run on any particular motor vehicle under any particular set of conditions are not per se part of the present invention and will readily be apparent to skilled test engineers.

Note that the apparatus described permits limited steering of the motor vehicle 45 in that pivotal movement of the motor vehicle about the pivot mounting device 53 is permitted, and since steering of the motor vehicle 45 from one side to another will necessarily result in lateral displacement of the motor vehicle 45 relative to the belt 89, the entire frame is laterally movable in guide track 51.

As illustrated, the apparatus will not quite simulate the vehicle characteristics as it is steered because the pivot axis of pivot support unit 53 is rearwardly displaced from the front wheels of the vehicle 45 which are being steered. The apparatus as illustrated has been designed so that there is a weight balance between the front and rear portions of the frame 57 and its associated restraint arms 59 and 61. Alternative support means however are possible which might more ideally respond to the steering dynamics of a motor vehicle under test on the apparatus. For example, the pivot means might be located further forward and the rear portion frame 57 supported by a further support device capable of moving through an arc of travel relative to the axis of rotation of pivot support element 53. The particular design and selection of the restraint device are within the design choice of the user. Many alternative restraint mechanisms will readily occur to those skilled in the art.

Other variations in the structure, operation and use of road surface simulation apparatus according to this invention will readily occur to those skilled in the art. The scope of the invention is as defined in the accompanying claims.

I claim:

1. Apparatus for facilitating the observation or measurement of one or more selected dynamic characteristics of a motor vehicle, comprising:
    endless movable road surface simulation means providing a simulated road surface for contacting simultaneously all of the wheels of the motor vehicle thereby to support the motor vehicle and to permit rotation of the wheels of the motor vehicle relative to the simulated road surface,
    restraining means for removably engaging the motor vehicle and whilst in engaging with the motor vehicle restraining the motor vehicle from longitudinal movement, said restraining means being mounted for pivotal movement about a vertical axis and lateral movement relative to the road surface simulation means, thereby to permit steering of the motor vehicle relative to the simulated road surface.

2. Apparatus as defined in claim 1, wherein the effective inertial load of the road surface simulation means is selected to be approximately equal to the mass of the motor vehicle.

3. Apparatus as defined in claim 1, additionally comprising measuring means coupled to the road surface simulation means for measuring a selected parameter representative of a selected dynamic characteristic of the motor vehicle.

4. Apparatus as defined in claim 1, wherein the road surface simulation means is a multiple roller-supported endless belt providing a relatively flat run at least equal in length to the wheel base of the motor vehicle.

5. Apparatus as defined in claim 1, wherein the road surface simulation means is selectably and removably coupleable with adjustable inertial mass means whose mass is adjustable so as to enable the effective inertial load of the road surface simulation means to be approximately equal to any of a selected group of motor vehicles of differing masses.

6. Apparatus as defined in claim 1, wherein the road surface simulation means is coupled to a generator driving a selected resistive load, thereby to simulate dynamic resistance such as wind resistance to the motion of the motor vehicle.

7. Apparatus as defined in claim 1, wherein the road surface simulation means is coupled to a generator and selectably to an adjustable reactive load connected to the output of the generator, whereby the combined reactance of the generator and the load may be varied to compensate for variation in the masses of motor vehicles to be tested or observed.

8. Apparatus as defined in claim 7, wherein the generator is a motor-generator selectably operable under feedback control in motor mode so as to compensate for a road surface simulation means mass in excess of the mass of the motor vehicle to be tested or observed.

9. Apparatus as defined in claim 1, wherein the road surface simulation means is adapted for superposed peripheral connection thereto of one or more additional road surface profile, detail or texture simulators so as to permit simulation of a variety of road surface conditions.

* * * * *